(12) United States Patent
Yamate

(10) Patent No.: US 7,781,099 B2
(45) Date of Patent: Aug. 24, 2010

(54) NON-AQUEOUS ELECTROLYTE SECONDARY CELL

(75) Inventor: Shigeki Yamate, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 1015 days.

(21) Appl. No.: 10/520,125

(22) PCT Filed: Jul. 3, 2003

(86) PCT No.: PCT/JP03/08508

§ 371 (c)(1),
(2), (4) Date: Jan. 3, 2005

(87) PCT Pub. No.: WO2004/006362

PCT Pub. Date: Jan. 15, 2004

(65) Prior Publication Data

US 2006/0127766 A1     Jun. 15, 2006

(30) Foreign Application Priority Data

Jul. 4, 2002   (JP)   ............................. 2002-196420
Mar. 25, 2003  (JP)   ............................. 2003-083921

(51) Int. Cl.
   *H01M 4/58*   (2010.01)
   *H01M 4/00*   (2006.01)
   *H01M 4/36*   (2006.01)

(52) U.S. Cl. .................... 429/218.1; 429/223; 429/226; 429/231.8

(58) Field of Classification Search ........................ None
See application file for complete search history.

(56) References Cited

U.S. PATENT DOCUMENTS

| | | | | |
|---|---|---|---|---|
| 6,090,505 A | * | 7/2000 | Shimamura et al. | 429/218.1 |
| 6,605,386 B1 | * | 8/2003 | Kasamatsu et al. | 429/218.1 |
| 2002/0006548 A1 | * | 1/2002 | Tsutsue et al. | 429/217 |

(Continued)

FOREIGN PATENT DOCUMENTS

EP          855752 A2    7/1998

(Continued)

OTHER PUBLICATIONS

M. H. Rahaman, Ceramic processing and Sintering, Second Edition, 2003.*

(Continued)

*Primary Examiner*—Dah-Wei D Yuan
*Assistant Examiner*—Edu E Enin-Okut
(74) *Attorney, Agent, or Firm*—Sughrue Mion, PLLC

(57) ABSTRACT

The present invention provides a non-aqueous electrolyte secondary battery having high energy density and satisfactory cycle performance by using an alloy comprising Ni and Sn as a negative active material. The non-aqueous electrolyte secondary battery comprises a negative electrode with a composite layer containing a negative active material, a positive electrode and a non-aqueous electrolyte. The negative active material consists of an alloy containing 5 to 25 mass % of nickel and 75 to 95 mass % of tin and the alloy contains $Sn_4Ni_3$ phase and Sn phase. It is preferable that the content ratio of $Sn_4Ni_3$ phase and Sn phase in the alloy be $0.2 \leq Z \leq 3$, when $m_1$ is the mass of $Sn_4Ni_3$ phase, $m_2$ is the mass of said Sn phase, and $Z=m_1/m_2$; and that the composite layer contain carbon material.

10 Claims, 8 Drawing Sheets

U.S. PATENT DOCUMENTS

2003/0064291 A1* 4/2003 Ehrlich .................. 429/231.95

FOREIGN PATENT DOCUMENTS

| EP | 1109239 | A1 |   | 6/2001 |
| --- | --- | --- | --- | --- |
| JP | 10-162823 | A |   | 6/1998 |
| JP | 2000-30703 | A |   | 1/2000 |
| JP | 2001-143700 | A |   | 5/2001 |
| JP | 2001143700 | A | * | 5/2001 |
| JP | 2001-256968 | A |   | 9/2001 |

OTHER PUBLICATIONS

Okamoto, H. "Ni-Sn (Nickel-Tin)." Journal of Phase Equilibria and Diffusion, 27(3) (2006): 315.*

Shigeki Yamate et al., "Development of Sn-Ni Alloy Negative Electrode for High-Energy-Density Type Lithium Secondary Cells", GS News Technical Report (2003) vol. 62, No. 1, pp. 16-20.

Shigeki Yamate et al., "Development of Tin-Nickel Alloy Negative Electrode with High Capacity for Lithium Secondary Cells" The $43^{rd}$ Battery Symposium in Japan (2002) vol. 3B04, pp. 330-331.

International Search Report for PCT/JP 2003-008508 dated Aug. 19, 2003.

* cited by examiner

NON-AQUEOUS ELECTROLYTE SECONDARY CELL

TECHNICAL FIELD

The present invention relates to a non-aqueous electrolyte secondary battery.

BACKGROUND ART

In recent years, in order to meet the demand for ever smaller, more functional portable devices, studies on further improving the energy density of the secondary batteries to be installed on such devices have been conducted vigorously.

A lithium-ion secondary battery having a lithium transition metal oxide positive electrode and a graphitic carbon negative electrode can be a typical example of high energy density secondary batteries. And, aiming for the realization of much higher energy density, the use of metal materials such as Al, Sn and Si, capable of alloying with Li, as a negative electrode is being considered.

However, these materials suffer significant changes in volume due to alloying; hence, the secondary batteries using these materials as a negative electrode are poor in cycle performance and insufficient for practical use. Some proposals for solving these problems have been made: for example, the use of an alloy consisting of Sn and Ni, the former is capable of alloying with Li and the latter is not (e.g. Japanese Provisional Publications No. 143700 of 2001 and No. 162823 of 1998.) These proposals are designed to achieve a secondary battery with high energy density and excellent cycle performance by using the properties of Sn and Ni, that is, Sn for the attainment of high energy density and Ni, which does not alloy with Li, for the maintenance of the framework structure of alloy and for the prevention of alloy degradation due to volume change.

The inventor of the present invention, too, has conducted studies on a negative electrode which is capable of achieving high energy density by the use of Sn. And, as a result, he has found that it is impossible to attain sufficient cycle performance only by mixing Sn and Ni and perform reversible charge/discharge by using a complete alloy of Sn and Ni, for example, $Sn_4Ni_3$ alloy, and that when an alloy having Sn phase and $Sn_4Ni_3$ phase is used, it is possible to realize satisfactory cycle performance and high energy density.

It is an object of the present invention to provide a non-aqueous electrolyte secondary battery having high energy density and satisfactory cycle performance by using an alloy comprising Ni and Sn as a negative active material.

DISCLOSURE OF THE INVENTION

The present invention provides a non-aqueous electrolyte secondary battery comprising a negative electrode with a composite layer containing a negative active material, a positive electrode, and a non-aqueous electrolyte; characterized in that said negative active material is an alloy containing 5 to 25 mass % of nickel and 75 to 95 mass % of tin, and that such alloy contains $Sn_4Ni_3$ phase and Sn phase.

According to the present invention, both high energy density and satisfactory cycle performance can be provided.

It is preferable that the ratio of $Sn_4Ni_3$ phase and Sn phase in the above described alloy be $0.2 \leq Z \leq 3$, supposing that $m_1$ is the mass of $Sn_4Ni_3$ phase, $m_2$ is the mass of Sn phase, and $Z = m_1/m_2$.

With this ratio being adopted, battery swelling can be reduced in the charge/discharge process at a low temperature not higher than 0° C. and, in addition, the alloy can be ground readily, so that its particle size control becomes easy, and this makes it possible to reduce the negative electrode manufacturing time and the cost.

In addition, it is preferable that the above described composite layer contain carbon material, thereby allowing battery swelling to be much more reduced in the charge/discharge process at a low temperature not higher than 0° C. When carbon material is contained, supposing that $n_1$ is the mass of the above described alloy, $n_2$ is the mass of carbon material, and $S = n_1/n_2$, it is more preferable that S fall within the range of $0.05 \leq S \leq 3.5$. This allows battery swelling in the charge process at a low temperature to be much more reduced.

In addition, when powdered negative active material is used in a composite layer, it is preferable that the porosity of the above described composite layer be 30 to 75%. The reason for this is that cycle performance and energy density can be further enhanced.

In addition, it is preferable that the apparent density of the above described negative electrode be 2.5 to 8.3 $g/cm^3$. The reason for this is that cycle performance and energy density can be further enhanced.

PREFERRED EMBODIMENTS OF THE INVENTION

Figure 1:
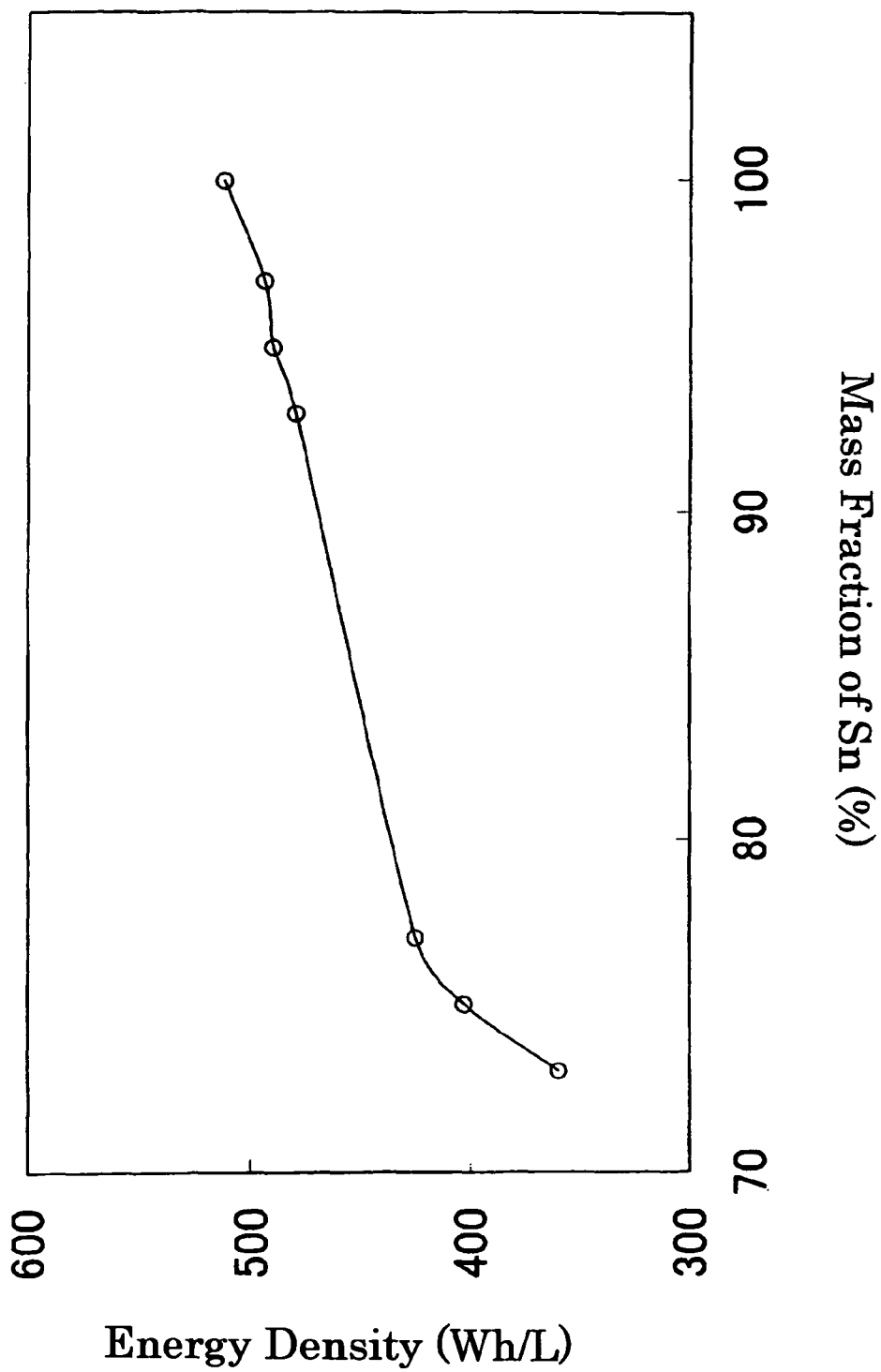
FIG. 1 is a view showing the relationship between the mass fraction of tin and the energy density.

The present invention provides a non-aqueous electrolyte secondary battery comprising a negative electrode with a composite layer containing a negative active material, a positive electrode, and a non-aqueous electrolyte; characterized in that said negative active material is an alloy containing 5 to 25 mass % of nickel (Ni) and 75 to 95 mass % of tin (Sn), and that such alloy contains $Sn_4Ni_3$ phase and Sn phase. In the above described ranges of 5 to 25 and 75 to 95, the values were expressed by the figures which were rounded to the nearest integer.

In the above described alloy, elements other than Sn and Ni may be contained; for example, nonmetallic elements such as N, P, C, O, etc., or metallic elements such as Cu, Co, Fe, Ag, Pb, etc. may be contained.

In addition, in the above described alloy, crystalline phases or noncrystalline phases other than $Sn_4Ni_3$ phase and Sn phase may be contained; for example, the phases containing Sn and Ni such as $Sn_2Ni_3$ phase, Sn—Ni amorphous phase, etc., the phases consisting of other elementary substances such as Cu phase, Fe phase, etc., and the phases containing other elements such as $Ag_3Sn$ phase, $Si_2Ni$ phase, etc. may be contained. In addition, this material may be an intermetallic compound, a solid solution or a mixture thereof, or may be eutectic or peritectic.

In the X-ray diffraction obtained with $CuK\alpha_1$ radiation, the alloy to be used in the present invention has peaks which lie in the ranges of $30.1°\leqq 2\theta \leqq 30.4°$ and $30.5°\leqq 2\theta \leqq 30.8°$. The peak lying in the range of $30.1°\leqq 2\theta \leqq 30.4°$ is attributed to $Sn_4Ni_3$ and the one in the range of $30.5°\leqq 2\theta \leqq 30.8°$ is attributed to Sn. Only Sn phase is capable of inserting/extracting Li reversibly, and $Sn_4Ni_3$ phase is not. $Sn_4Ni_3$ phase serves as the matrix capable of electronic conduction which supports Sn phase and, in the charge/discharge reaction of Sn phase, the matrix of $Sn_4Ni_3$ phase holds the crystalline structure; therefore, the charge/discharge cycle performance of Sn—Ni alloy is believed to improve. In the X-ray diffraction pattern, a peak indicates a local maximal value of diffraction intensity.

In addition, when the amounts of Ni and Sn contained in the alloy fall outside the ranges of 5 to 25 mass % and 75 to 95 mass %, respectively, a deterioration in cycle performance or a decrease in capacity is caused.

Concerning the manufacturing method for the alloy to be used in the present invention, various methods can be applied: for example, a method of cooling a molten metal on a water cooled copper hearth and the like after the molten metal was prepared by dissolving and mixing the metals such as Sn, Ni, etc. in an arc melting furnace and the like; electroplating method; electroless plating method; sputtering method; vacuum evaporation method; mechanical milling method; gas atomization method, etc.

When the molten metal cooling method described above is used, it is desirable that the cooling rate of molten metal fall within the range of $1\times 10^{2°}$ C./sec to $5\times 10^{4°}$ C./sec. When the cooling rate of molten metal is not less than $1\times 10^{2°}$ C./sec, it is possible to obtain an alloy in which the fine crystallites of Sn phase and $Sn_4Ni_3$ phase are uniformly contained. Hence, it is desirable that the cooling rate of molten metal be not less than $1\times 10^{2°}$ C./sec. In addition, in order to set the cooling rate of molten metal greater than $5\times 10^{4°}$ C./sec, huge facilities are required; hence, it is desirable that the cooling rate of molten metal be not greater than $5\times 10^{4°}$ C./sec. When Sn and Ni are melted together and then quickly cooled under the above described conditions, the uniform mixed alloy of Sn phase and $Sn_4Ni_3$ phase thus prepared; therefore, cycle performance becomes satisfactory.

The manufacturing method for the alloy to be used in the present invention is not considered limited to the above described manufacturing methods. Electroplating method is also a preferable one. The reason for this is that the part which is obtained by electroplating Sn—Ni alloy on a substrate can be readily used as the negative electrode of a non-aqueous electrolyte battery; hence the negative electrode manufacturing time can be reduced significantly.

As the substrate to be used for electroplating, it is preferable that a plane, three-dimensional pored structure or network structure having Cu or Ni as a major component be used. Here, having Cu or Ni as a major component means that Cu or Ni content (mass %) is the highest in the respective contents of the components which make up the substrate. Examples for those having Cu or Ni as a major component include pure Cu foil, pure Ni foil, their alloy doped with trace amounts of metals, surface-treated Cu foil, etc. Concrete examples of a plane structure are, for example, a foil, a plate, etc.; those of a three-dimensional pored structure are, for example, a foam body, a sintered body, etc.; and those of a network structure are, for example, an expanded lattice, a punching metal, a mesh, etc.

It is preferable that the ratio of $Sn_4Ni_3$ phase to Sn phase in the manufacturing of alloy be $0.2\leqq Z\leqq 3$, supposing that $m_1$ is the mass of $Sn_4Ni_3$ phase, $m_2$ is the mass of Sn phase, and $Z=m_1/m_2$. The reason for this is that battery swelling can be reduced in the charge/discharge process at a low temperature not higher than 0° C., and that the alloy can be ground readily.

The negative electrode to be used in the present invention has a composite layer containing the above described alloy as a negative active material, and it is preferable that the composite layer contain carbon material.

In the non-aqueous electrolyte secondary battery which was produced using the negative electrode where the negative active material contained in the composite layer consists of the above described alloy alone, the above described alloy expands significantly during charge; hence, when charged fast at a temperature of 0° C., the battery swells significantly. In addition, in the non-aqueous electrolyte secondary battery which was produced using the negative electrode where the negative active material contained in the composite layer consists of carbon material alone, the amount of metallic lithium deposition on the surface of the carbon material during charge is large; hence, when charged fast at a temperature of 0° C., the battery swells significantly.

Meanwhile, in the non-aqueous electrolyte secondary battery which was produced using the negative electrode where the negative active material contained in the composite layer consists of the above described alloy and carbon material, battery swelling is reduced. The reason for this is believed to be that the above described alloy reduces the lithium depositions on the surface of the carbon material, and that the carbon material reduces the nonuniformity of current distribution, which occurs from a decrease in current collection at the composite layer caused due to alloy expansion, and the resultant lithium deposition, that is, reduces the deterioration of current collection.

When carbon material is contained in the composite layer, supposing that $n_1$ is the mass of the above described alloy, $n_2$ is the mass of carbon material, and $S(=n_1/n_2)$ is the ratio of $n_1$ to $n_2$, it is preferable that S fall within the range of $0.05\leqq S\leqq 3.5$.

When S value is either smaller than 0.05 or greater than 3.5, battery swelling cannot be reduced sufficiently. This is believed to be due to the insufficiency of the above described mechanism.

Concerning the above described carbon material, the material is not to be considered limited specifically; for example, it is possible to use graphitic carbon materials such as natural graphite, artificial graphite, etc., acetylene black, ketjen black, vapor grown carbon fiber, cokes, pyrolytic carbon, activated carbon, or mixtures thereof. The form is not limited specifically; for example, scale like, fiber like, spherical, or massive form is included. In addition, boron, aluminum, etc. may be added to the carbon material.

When a powdered negative active material is used for a composite layer, it is preferable that the porosity of the above described composite layer fall within the range of 30 to 75%. With this range being adopted, cycle performance can be further enhanced and battery energy density can be much increased. When the porosity is less than 30%, cycle performance deteriorates, and when it is greater than 75%, battery energy density decreases.

When a negative electrode is prepared according to the following manner; for example, a paste is prepared by mixing a negative active material, a binder and a disperse medium, followed by this paste is coated on a metal foil, and later on only the disperse medium is removed; a composite layer refers to the portion combining the active material and the binder except a metal foil portion in the negative electrode. In addition, when a negative electrode is prepared by synthesizing Sn—Ni alloy on a foil substrate using electroplating method, it refers to the Sn—Ni alloy portion except the foil substrate portion in the negative electrode. In this case, a binder is not contained in the composite layer.

The porosity of a composite layer shall be defined by the following equations:

[Porosity of a composite layer] (%)=100−[true volume of the composite]/[apparent volume of the composite layer]×100,

[True volume of the composite]=[mass of the composite layer]/[average density of the material composing the composite layer].

In addition, it is preferable that the apparent density of a negative electrode fall within the range of 2.5 to 8.3 $g/cm^3$. With this range being adopted, cycle performance can be further improved and battery energy density can be much increased.

When the apparent density of a negative electrode is less than 2.5 $g/cm^3$, the volume occupied by a current collector is small; therefore, an increase in internal resistance or the cutting of an electrode plate tends to occur, and cycle performance deteriorates significantly. In addition, when the apparent density of a negative electrode is greater than 8.3 $g/cm^3$, the proportion occupied by a current collector in the negative electrode rises and the amount of active material per unit volume in the negative electrode decreases; therefore, the energy density becomes less than those of graphite/lithium transition metal oxides which have been well known.

The apparent density of a negative electrode is defined by the following equation:

[Apparent density of a negative electrode]=[mass of the negative electrode]/[apparent volume of the negative electrode].

In the non-aqueous electrolyte secondary battery of the present invention, any shapes may be applied to the positive electrode and the negative electrode; for example, sheet type, pellet type, etc. can be used. As concrete examples of a sheet-type electrode plate, the one prepared by placing on a metal foil a composite layer containing an active material, the one prepared by filling a metal foam with a composite containing an active material, etc. are included. As concrete examples of a pellet-type electrode plate, the one obtained by press molding a composite containing an active material, the one prepared by filling a metal can with a composite containing an active material, etc. are included.

In addition, it is preferable that the positive and negative electrodes contain current collector substrates; for example, a plane structure such as copper, nickel, aluminum, etc., a three-dimensional porosity structure, or a network structure be applicable. Concrete examples of the plane structure are, for example, a foil, a plate, etc.; those of the three-dimensional porosity structure are, for example, a foam body, a sintered body, etc.; and those of the network structure are, for example, an expanded lattice, a punching metal, a mesh, etc.

As the non-aqueous electrolyte to be used in the non-aqueous electrolyte secondary battery of the present invention, a non-aqueous electrolyte solution or a solid electrolyte can be used without specific limitation.

For example, when a non-aqueous electrolyte solution is used, the following polar solvents or the mixed solvents arbitrarily containing them can be used as the solvent: ethylene carbonate, propylene carbonate, dimethyl carbonate, diethyl carbonate, methyl ethyl carbonate; γ-butyrolactone, sulfolane, dimethyl sulfoxide; acetonitrile, dimethyl formamide, dimethyl acetamide, 1,2-dimethoxyethane, 1,2-diethoxyethane, tetrahydrofuran, 2-methyl tetrahydrofuran, dioxolane, methyl acetate, ethyl acetate, etc.

In addition, as the solute, the following lithium salts or mixtures thereof can be used: $LiPF_6$, $LiBF_4$, $LiAsF_6$, $LiClO_4$, LiSCN, LiI, LiCl, LiBr, $LiCF_3CO_2$, $LiCF_3SO_3$, $LiC_4F_9SO_3$, $LiN(SO_2CF_3)_2$, $LiN(SO_2CF_2CF_3)_2$, $LiN(SO_2CF_3)(SO_2CF_2CF_2CF_3)$, $LiN(COCF_3)_2$, $LiN(COCF_2CF_3)_2$, etc.

When a solid electrolyte is used, it is possible to use, for example, an inorganic solid electrolyte such as Li-containing chalcogenide, etc., a single ion conductor consisting of $Li^+$-containing polymer, a polymer electrolyte where lithium salt is contained in a polymer, etc. Concerning the polymer electrolyte, lithium salt may be contained in a polymer by wetting or swelling the polymer with a non-aqueous electrolyte solution, or lithium salt alone may be dissolved in a polymer.

As the lithium salt to be contained in the polymer electrolyte, the following lithium salts or mixtures thereof can be used: $LiPF_6$, $LiBF_4$, $LiAsF_6$, $LiClO_4$, LiSCN, LiI, LiCl, LiBr, $LiCF_3CO_2$, $LiCF_3SO_3$, $LiC_4F_9SO_3$, $LiN(SO_2CF_3)_2$, $LiN(SO_2CF_2CF_3)_2$, $LiN(SO_2CF_3)(SO_2CF_2CF_2CF_3)$, $LiN(COCF_3)_2$, $LiN(COCF_2CF_3)_2$, etc. Moreover, when a solid electrolyte is used, several electrolytes may be contained in a battery. For example, different electrolytes can be used in the positive electrode and the negative electrode, respectively.

As the polymer to be used for the polymer electrolyte, it is preferable that it exhibit satisfactory ion conductivity when wetted or swelled with a non-aqueous electrolyte solution; for example, polyether such as poly(ethylene oxide) (PEO), poly (propylene oxide) (PPO), etc., poly(vinylidene fluoride) (PVdF), poly(vinyl chloride) (PVC), polyacrylonitrile (PAN), poly(vinylidene chloride), poly(methyl methacrylate), poly(methyl acrylate), poly(vinyl alcohol), polyacrylonitrile, polymethacrylonitrile, poly(vinyl acetate), polyvinylpyrrolidone, polyethyleneimine, polybutadiene, polystyrene, polyisoprene, or derivatives thereof can be used alone or by mixture. In addition, it is also possible to use polymers prepared by copolymerization of each monomer composing the above described polymers; for example, vinylidene fluoride/hexafluoropropylene copolymer (P(VdF/HEP)), styrene-butadiene rubber (SBR), etc.

The reason for using these polymer electrolytes is that the $Li^+$ ion conductivity and mobility are enhanced, so that battery polarization can be minimized. In addition, it is preferable that a polymer electrolyte be free to change in shape. The reason for this is that it is possible to follow the volume expansion/contraction of a negative active material due to charge/discharge, thereby allowing the electronic conduction performance and ion conduction performance of the negative electrode to be maintained satisfactory.

In the non-aqueous electrolyte secondary battery of the present invention, the negative electrode or positive electrode (or both of them) may contain a polymer electrolyte. It is preferable that this polymer electrode exhibit lithium ion conductivity and binding property. The reason for this is that the binding property between active material and active material and between active material and polymer electrolyte is satisfactory in this negative electrode or positive electrode, and that the electronic conduction performance and ion conduction performance of the negative electrode can be maintained satisfactory. Especially, it is preferable that the polymer electrolyte be porous. The reason for this is that holding electrolyte solution in a pore causes the ion conductivity of polymer electrolyte to further improve.

As the positive active material to be used in the non-aqueous electrolyte secondary battery of the present invention, the following can be used: for example, composite oxides expressed by composition formulas $Li_xMO_2$, $Li_xM_yM'_zO_2$ or $Li_yM_2O_4$ (where M and M' are transition metals, $0 \leq x \leq 1$, $0 \leq y \leq 2$, and y+z=1 or 2), oxides having tunnel-like holes, metal chalcogenide having layer structures, etc. As concrete examples of them, $LiCoO_2$, $LiNiO_2$, $LiCu_{0.2}Ni_{0.8}O_2$, $LiCu_{0.15}Ni_{0.85}O_2$, $LiNi_{0.5}Mn_{1.5}O_2$, $LiMn_2O_4$, $LiMnO_2$, $MnO_2$, $FeO_2$, $V_2O_5$, $V_6O_{13}$, $TiO_2$, $TiS_2$, NiOOH, FeOOH, FeS, etc. are included. Each active material described above may be used in arbitrary mixture.

When a material not containing Li, such as $MnO_2$, $FeO_2$, $V_2O_5$, $V_6O_{13}$, $TiO_2$, $TiS_2$, NiOOH, FeOOH, FeS, etc., is used as the positive active material, a battery may be produced using the one in which $Li^+$ is chemically inserted in the positive electrode or negative electrode. For example, a case of using the one prepared by bringing the positive electrode or negative electrode into contact with metallic lithium in a non-aqueous electrolyte containing $Li^+$, a case of attaching metallic Li on the surface of the positive electrode or negative electrode, etc. are included.

In addition, a separator may be used in the non-aqueous electrolyte secondary battery of the present invention. For example, an insulating polyolefin microporous membrane, an inorganic solid electrolyte membrane, a polymer electrolyte membrane, etc. can be applied. In addition, it is also possible to use an insulating microporous membrane in combination with a polymer electrolyte.

In addition, a form of battery case can be selected from, for example, a prismatic shape, a cylindrical shape, an elliptic cylindrical shape, the one fabricated with sheet material in an envelop-like shape, the one processed by molding the sheet which was prepared by coating metallic, such as aluminum, sheet with resin, etc. As the material of battery case, it is possible to select a material mainly composed of, for example, iron, aluminum, etc.

EMBODIMENTS

Hereinafter, preferred embodiments of the present invention will be described; however, the scope of application of the present invention will not be limited to them.

Embodiment 1

In this example, Sn powder and Ni powder were weighed out to 95 mass % and 5 mass %, respectively, and preparatively mixed in a mortar. This mixed powder and SUS balls for ball-milling were enclosed in a SUS hermetically-sealed container for the ball-milling under an argon atmosphere. Subsequently, this container was set in a planetary ball mill, the powder inside was milled for 30 minutes, and the obtained powder was dried at 150° C., thereby producing an alloy containing 95 mass % of Sn and 5 mass % of Ni. This alloy was used as the negative active material.

A paste was mixed and prepared so as to consist of 45 mass % of the powdered negative active material above described, 10 mass % of PVdF as a binder and 45 mass % of N-methyl-2-pyrrolidone (NMP) a applied to both surfaces of Cu foil of 27 mm in width and 10 μm in thickness; the coated foil was dried at 150° C. to evaporate NMP and then pressed to adjust the porosity; and thus the negative electrode was produced.

A paste was mixed and prepared so as to consist of 70 mass % of lithium cobalt oxide, 6 mass % of acetylene black, 9 mass % of PVdF and 15 mass % of NMP, and applied to both surfaces of aluminum foil of 27 mm in width and 15 μm in thickness; the coated foil was dried at 150° C. to evaporate NMP and then pressed; and thus the positive electrode was produced.

These positive and negative electrodes and a polyethylene separator of 29 mm in width and 25 μm in thickness were wound and then inserted into a stainless case of 47.5 mm in height, 29.2 mm in width and 4.55 mm in thickness. Furthermore, positive and negative leads were welded on to the positive and negative terminals located on the cover of the battery case, respectively, by means of ultrasonic welding, and then the cover was joined to the battery case by laser welding.

A mixed solution containing 1 mol/l of $LiPF_6$ dissolved in a mixture of ethylene carbonate (EC) and diethyl carbonate (DEC) in a volume ratio of 1:1 was used as an electrolyte. This electrolyte solution was poured through a filling opening of 1 mm in diameter provided on the battery case, and then the opening was sealed by laser welding. Battery assembly was implemented inside a dry room at 25° C. According to the above described procedures, Battery (A) of Embodiment 1 was manufactured.

Embodiments 2 to 4

To these examples, alloy compositions shown in Table 1 were applied, where the weighing amounts of Sn powder and Ni powder were varied in the course of the preparation of the negative active material; except for the above, Batteries (B) to (D) of Embodiments 2 to 4 were manufactured in an identical manner to that of Embodiment 1.

Comparative Examples 1 to 3

To these examples, alloy compositions shown in Table 1 were applied, where the weighing amounts of Sn powder and Ni powder were varied in the course of the preparation of the negative active material except for the above, Batteries (E) to (G) of Comparative Examples 1 to 3 were manufactured in an identical manner to that of Embodiment 1.

Comparative Example 4

In this example, Sn powder and Ni powder were weighed out to 77 mass % and 23 mass %, respectively, mixed in a mortar, and used as the negative active material without mechanical milling; except for the above, Battery (H) of Comparative Example 4 was manufactured in an identical manner to that of Embodiment 1.

Table 1 shows details of Batteries (A) to (D) of Embodiments 1 to 4 and Batteries (E) to (H) of Comparative Examples 1 to 4.

TABLE 1

| | Battery | Alloy composition used for negative active material mass % Sn | Alloy composition used for negative active material mass % Ni | Porosity of negative composite layer % | Appearance of XRD peak 30.1° ≤ 2θ ≤ 30.4° | Appearance of XRD peak 30.5° ≤ 2θ ≤ 30.8° |
|---|---|---|---|---|---|---|
| Comparative Example 1 | E | 100 | 0 | 50 | Appeared | Appeared |
| Comparative Example 2 | F | 97 | 3 | 50 | Appeared | Appeared |
| Embodiment 1 | A | 95 | 5 | 50 | Appeared | Appeared |
| Embodiment 2 | B | 93 | 7 | 50 | Appeared | Appeared |
| Embodiment 3 | C | 77 | 23 | 50 | Appeared | Appeared |
| Embodiment 4 | D | 75 | 25 | 50 | Appeared | Appeared |
| Comparative Example 3 | G | 73 | 27 | 50 | Appeared | Appeared |
| Comparative Example 4 | H | 77 | 23 | 50 | Not appeared | Appeared |

Battery Evaluation Test

Using Batteries (A) to (H), a charge/discharge test was conducted in an incubator kept at 25° C. In this test, each battery was charged at a constant current of 40 mA until the voltage reached 4.1 V and subsequently charged for 2 hours at a constant voltage of 4.1 V, and then discharged at a constant current of 160 mA until the voltage dropped to 2.7 V: taking these steps as one cycle, charge/discharge was repeated 30 cycles. The discharge capacity, volumetric energy density and coulombic efficiency at the 1st cycle of each battery, and the capacity retention at the 30th cycle were determined. Here the coulombic efficiency at the 1st cycle (%) and the capacity retention at the 30th cycle (%) shall be defined by the following equations;

[Coulombic efficiency at the 1st cycle]=[discharge capacity at the 1st cycle]/[quantity of electric charge at the 1st cycle]×100

[Capacity retention at the 30th cycle]=[discharge capacity at the 30th cycle]/[discharge capacity at the 1st cycle]×100

Comparative Example 5

In this example, a paste was mixed and prepared so as to consist of 50 mass % of powdered graphitic carbon, 5 mass % of PVdF and 45 mass % of NMP, and applied to both surfaces of Cu foil of 27 mm in width and 14 μm in thickness; the coated foil was dried at 150° C. to evaporate NMP and then pressed; and thus the negative electrode was produced. Except for using this negative electrode, Battery (I) of Comparative Example 5 was manufactured in an identical manner to that of Embodiment 1.

Using Battery (I), a charge/discharge test was conducted in an incubator kept at 25° C. In this test, each battery was charged at a constant current of 40 mA until the voltage reached 4.1 V and subsequently charged for 2 hours at a constant voltage of 4.1 V, and then discharged at a constant current of 160 mA until the voltage dropped to 2.7 V: taking these steps as one cycle, charge/discharge was repeated 30 cycles.

The discharge capacity, volumetric energy density and coulombic efficiency at the 1st cycle and the capacity retention at the 30th cycle of each battery were determined.

Table 2 shows the measurement results for Batteries (A) to (I). In addition, the relationship between the mass fraction of the tin contained in the alloy used as the negative active material and the energy density was illustrated in FIG. 1, and the relationship between the mass fraction of the tin contained in the alloy used as the negative active material and the capacity retention at the 30th cycle was illustrated in FIG. 2.

TABLE 2

| | Battery | 1st cycle Discharge capacity mAh | 1st cycle Energy density Wh/L | 1st cycle Coulombic efficiency % | 30th cycle Capacity retention % |
|---|---|---|---|---|---|
| Comparative Example 1 | E | 1000 | 512 | 85 | 40 |
| Comparative Example 2 | F | 963 | 494 | 88 | 75 |
| Embodiment 1 | A | 956 | 490 | 88 | 95 |
| Embodiment 2 | B | 940 | 480 | 88 | 96 |
| Embodiment 3 | C | 830 | 425 | 90 | 99 |
| Embodiment 4 | D | 786 | 403 | 90 | 99 |
| Comparative Example 3 | G | 704 | 360 | 90 | 99 |
| Comparative Example 4 | H | 830 | 425 | 65 | 20 |
| Comparative Example 5 | I | 610 | 390 | 90 | 99 |

In Battery (I) of Comparative Example 5, where conventional graphitic carbon powder was used as the negative active material, the energy density is 390 Wh/L. Accordingly, in order to have a battery whose energy density is higher than that of the conventional type, the energy density of the battery is required to exceed 390 Wh/L. In addition, the coulombic efficiency should be not less than 84%. The reason for this is that when coulombic efficiency is less than 84%, metallic Li deposition on the surface of the negative electrode tends to occur easily during charge, and accordingly that a decrease in safety or an increase in battery swelling is caused. The capacity retention at the 30th cycle has to be not less than 60%, and preferably not less than 85%. This is due to the reason that the capacity retention at the 30th cycle being less than 60% is not suitable for practical use for a secondary battery, and that that of less than 85% is not appropriate when prolonged use is expected.

Figure 2:
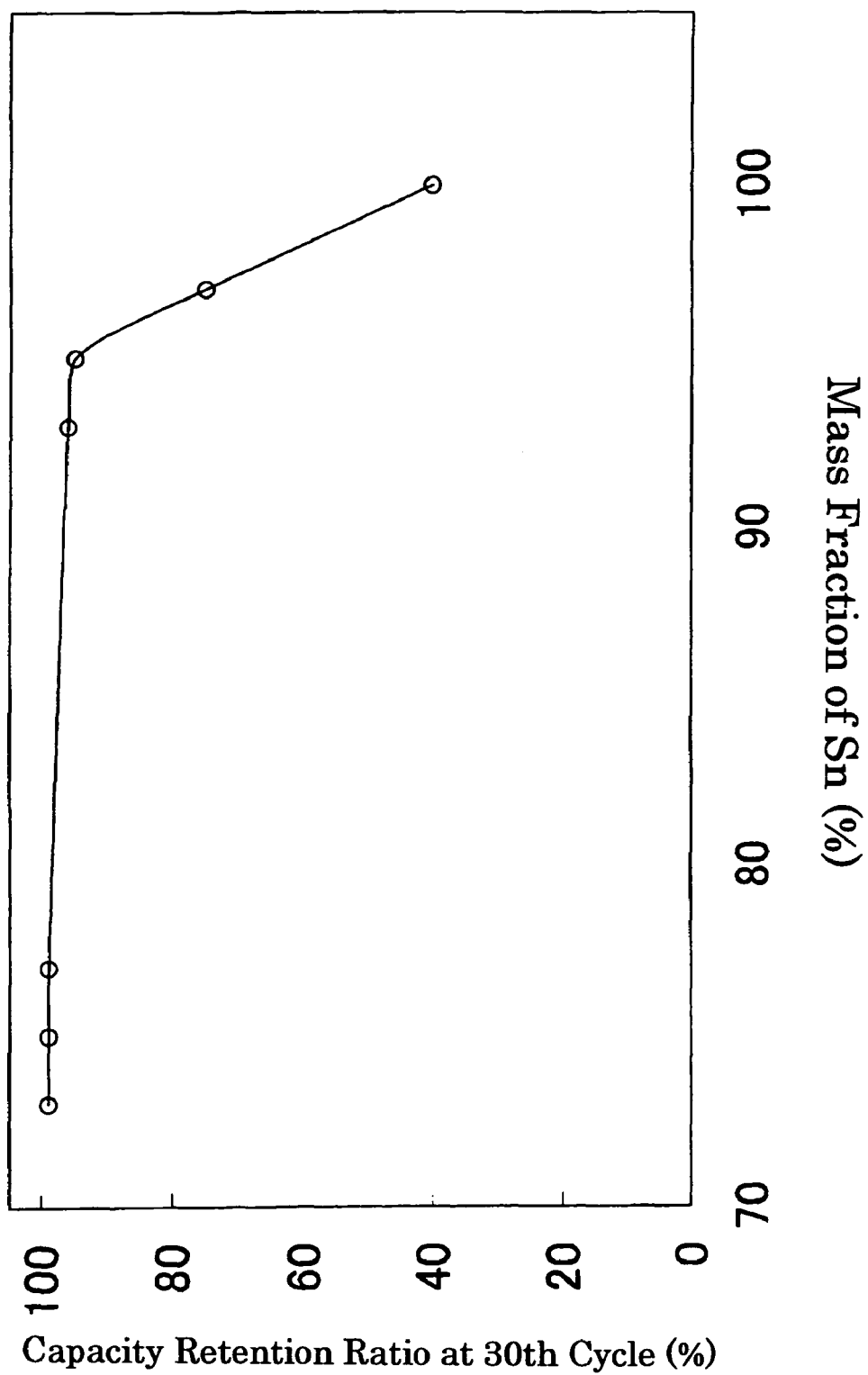
FIG. 2 is a view showing the relationship between the mass fraction of tin and the capacity retention at the 30th cycle.

From FIG. 1, it is found that when the tin contained in the alloy is less than 75 mass %, the energy density drastically decreases down to 390 Wh/L or less. In addition, from FIG. 2, it is found that when the tin contained in the alloy exceeds 95 mass %, the capacity retention at the 30th cycle drastically decreases to less than 60%. Accordingly, the alloy should contain 75 to 95 mass % of tin.

Likewise, it is found that when the nickel contained in the alloy is greater than 25 mass %, the energy density drastically decreases to 390 Wh/L or less. In addition; it is found that when the nickel contained in the alloy is less than 5 mass %, the capacity retention at the 30th cycle drastically decreases to less than 60%. Accordingly, the alloy should contain 5 to 25 mass % of nickel.

In addition, peaks in an X-ray diffraction pattern were noted to lie in both ranges of $30.1° \leq 2\theta \leq 30.4°$ and $30.5° \leq 2\theta \leq 30.8°$; in Batteries (A) to (D) of Embodiments 1 to 4, where the alloy containing $Sn_4Ni_3$ phase and Sn phase is used as the negative active material, the capacity retention at the 30th cycle was found to be as high as 95% or more. On the other hand, in Battery (H), where the peak lay only in the latter range, the capacity retention at the 30th cycle was found to be as remarkably low as 20%. XRD analysis was conducted by means of a powder diffraction method with $CuK\alpha_1$ radiation, and the finding that the above described two phases were contained in the alloy was confirmed by using EPMA, as well as the peak analysis by XRD. Hereinafter, for the materials prepared by means of ball milling, confirmation was performed in the same manner.

Embodiment 5

In this example, Cu foil of 27 mm in width and 14 μm in thickness was immersed in a commercially-manufactured Sn-Ni plating solution (Kojundo Chemical Lab. Co., Ltd., SNS-200E). After that, using the Sn-Ni alloy containing 28 mass % of Ni in the counter electrode, electricity was conducted so that the cathode current density becomes $2 A/dm^3$, and Sn-Ni alloy was synthesized on the Cu foil. After washed with ion exchange water, this material was dried at 150°C., and thus the negative electrode was prepared. As a result of conducting the quantitative analysis of element, the composition of this Sn-Ni alloy was found to be 85 mass % of Sn and 15 mass % of Ni. In addition, in the X-ray diffraction pattern of this Sn-Ni alloy, the peaks due to $CuK\mu_1$ radiation lay at $2\theta=30.3°$ and $30.6°$. Except for using this negative electrode, Battery (J) of Embodiment 5 was manufactured in an identical manner to that of Embodiment 1.

Embodiments 6 to 12

In these examples, Sn powder and Ni powder were weighed out to 85 mass % and 15 mass %, respectively, to make the alloy containing 85 mass % of tin and 15 mass % of nickel, the obtained material was used as the negative active material, and the porosities of the negative composite layer were varied, as shown in Table 3, by pressing; except for the above, Batteries (K) to (O) of Embodiments 6 to 12 were manufactured in an identical manner to that of Embodiment 1.

Table 3 shows details of Batteries (J) to (Q).

TABLE 3

| | Battery | Porosity of negative composite layer % | Appearance of XRD peak | |
| --- | --- | --- | --- | --- |
| | | | $30.1° \leq 2\theta \leq 30.4°$ | $30.5° \leq 2\theta \leq 30.8°$ |
| Embodiment 5 | J | — | Appeared | Appeared |
| Embodiment 6 | K | 28 | Appeared | Appeared |
| Embodiment 7 | L | 30 | Appeared | Appeared |
| Embodiment 8 | M | 32 | Appeared | Appeared |
| Embodiment 9 | N | 50 | Appeared | Appeared |
| Embodiment 10 | O | 73 | Appeared | Appeared |
| Embodiment 11 | P | 75 | Appeared | Appeared |
| Embodiment 12 | Q | 77 | Appeared | Appeared |

Concerning Batteries (J) to (Q) of Embodiments 5 to 12, the discharge capacity, volumetric energy density and coulombic efficiency at the 1st cycle, and the capacity retention at the 30th cycle were obtained under the same conditions as Battery (A) of Embodiment 1. The results are shown in Table 4.

TABLE 4

| | Battery | 1st cycle | | | 30th cycle |
| --- | --- | --- | --- | --- | --- |
| | | Discharge capacity mAh | Energy density Wh/L | Coulombic efficiency % | Capacity retention % |
| Embodiment 5 | J | 906 | 465 | 92 | 100 |
| Embodiment 6 | K | 890 | 457 | 84 | 60 |
| Embodiment 7 | L | 877 | 450 | 86 | 90 |
| Embodiment 8 | M | 863 | 443 | 86 | 95 |
| Embodiment 9 | N | 854 | 428 | 89 | 97 |
| Embodiment 10 | O | 848 | 415 | 91 | 98 |
| Embodiment 11 | P | 840 | 409 | 91 | 98 |
| Embodiment 12 | Q | 803 | 391 | 91 | 98 |

In a comparison between the battery of Embodiment 5, where the alloy made by electroplating was applied to the negative active material, and Batteries (K) to (Q) of Embodiments 6 to 12, where the alloy made by mechanical milling was applied to the negative active material, the former showed higher values than the latter in every item in the discharge capacity, volumetric energy density and coulombic efficiency at the 1st cycle, and the capacity retention at the 30th cycle. Based on this finding, it is obvious that electroplating is preferable as an alloy manufacturing process.

Table 3 shows the relationship between the porosity of the negative composite layer and the energy density. In addition, Table 4 shows the relationship between the porosity of the negative active material layer and the capacity retention.

Figure 3:
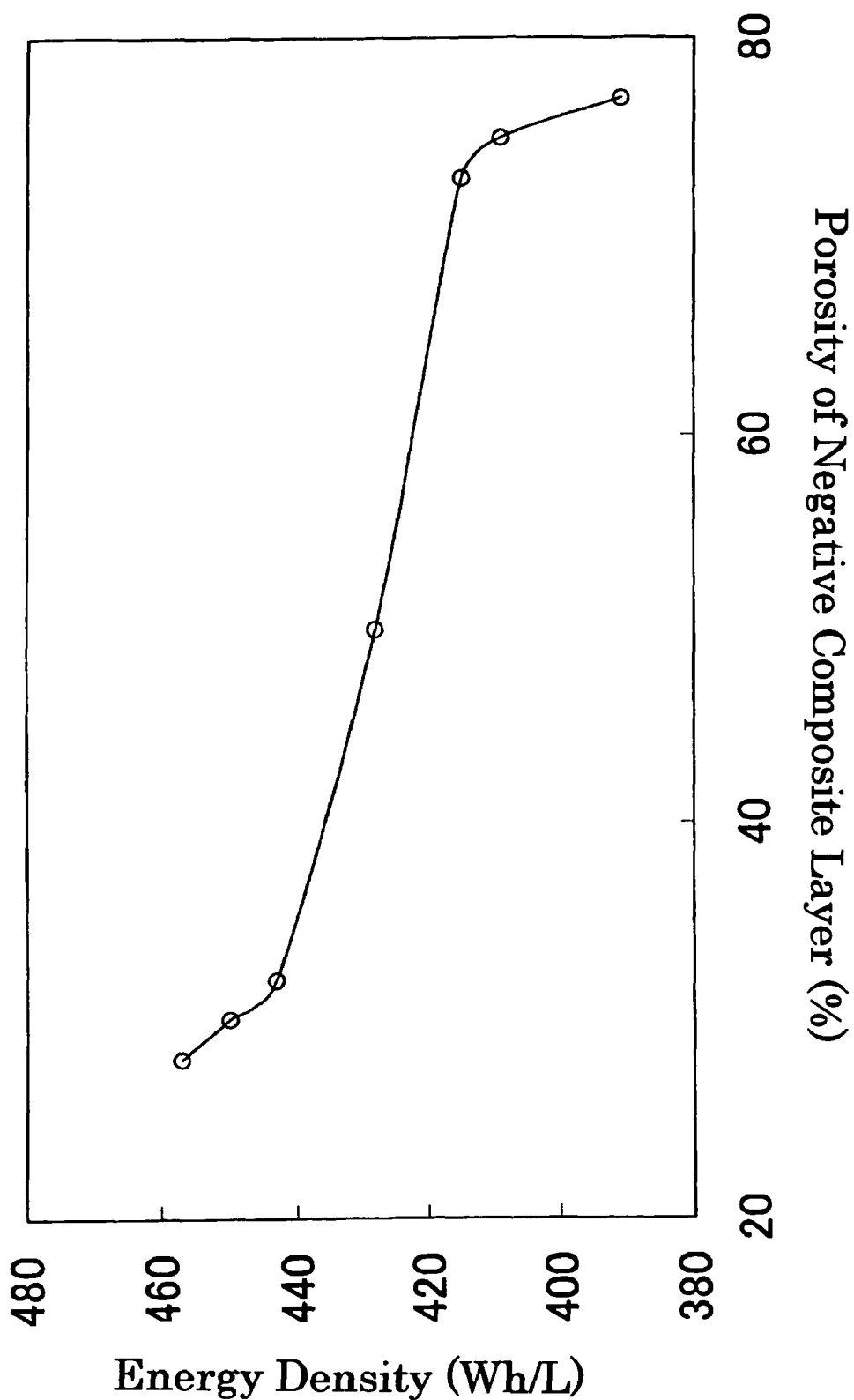
FIG. 3 is a view showing the relationship between the porosity of the negative composite layer and the energy density.
Figure 4:
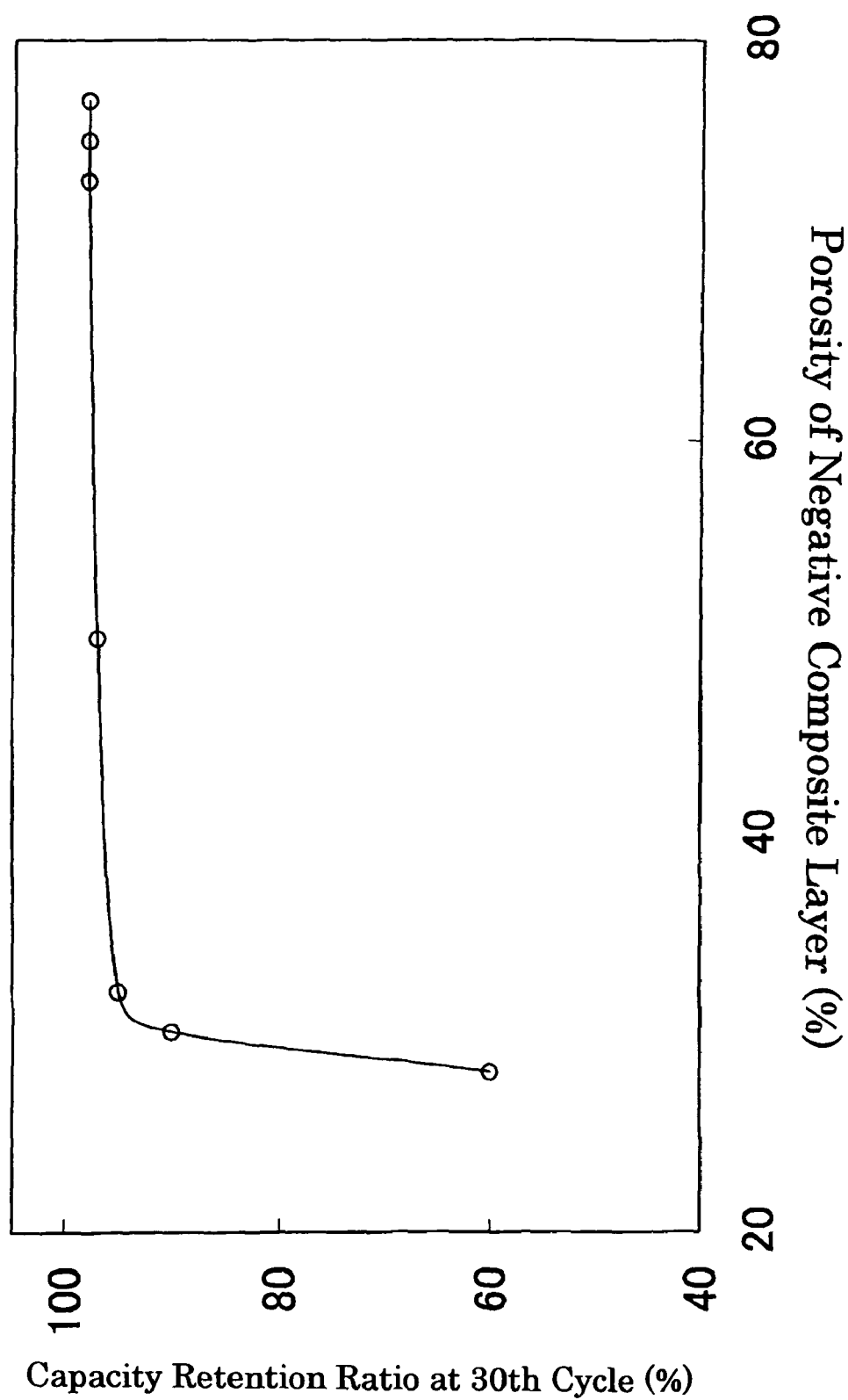
FIG. 4 is a view showing the relationship between the porosity of the negative composite layer and the capacity retention.

From FIG. 3, it is found that when the porosity of the negative composite layer exceeds 75%, the energy density drastically decreases. In addition, from FIG. 4, when the porosity of the negative composite layer is less than 30%, the capacity retention remarkably decreases. Accordingly, when powdered negative active material is used for the composite layer, it is preferable that the porosity of the negative composite layer fall within the range of 30% to 75%.

Embodiments 13 to 15

In these examples, the thicknesses of the Cu foil serving as the substrate in electroplating were varied as shown in Table 5; except for the above, Batteries (R) to (T) of Embodiments 13 to 15 were manufactured in an identical manner to that of Embodiment 5.

Embodiments 16 to 18

In these examples, the thicknesses of the Cu foil to be used for the negative current collector were varied as shown in Table 5; except for the above, Batteries (U) to (W) of Embodiments 16 to 18 were manufactured in an identical manner to that of Embodiment 6.

Table 5 shows details of Batteries (R) to (W) of Embodiments 13 to 18.

TABLE 5

| | Battery | Thickness of Cu foil μm | Apparent density of negative electrode g/cm³ | Porosity of negative composite layer % | Appearance of XRD peak | |
|---|---|---|---|---|---|---|
| | | | | | $30.1° \leq 2\theta \leq 30.4°$ | $30.5° \leq 2\theta \leq 30.8°$ |
| Embodiment 13 | R | 4 | 2.2 | — | Appeared | Appeared |
| Embodiment 14 | S | 8 | 2.5 | — | Appeared | Appeared |
| Embodiment 15 | T | 12 | 2.8 | — | Appeared | Appeared |
| Embodiment 16 | U | 45 | 8.2 | 30 | Appeared | Appeared |
| Embodiment 17 | V | 50 | 8.3 | 30 | Appeared | Appeared |
| Embodiment 18 | W | 55 | 8.4 | 30 | Appeared | Appeared |

Concerning Batteries (R) to (W) of Embodiments 13 to 18, the discharge capacity, volumetric energy density and coulombic efficiency at the 1st cycle, and the capacity retention at the 30th cycle were determined under the same conditions as Battery (A) of Embodiment 1. The results are shown in Table 6.

TABLE 6

| | | 1st cycle | | | |
|---|---|---|---|---|---|
| | Battery | Discharge capacity mAh | Energy density Wh/L | Cloulombic efficiency % | 30th cycle Capacity retention % |
| Embodiment 13 | R | 890 | 457 | 86 | 60 |
| Embodiment 14 | S | 877 | 450 | 86 | 90 |
| Embodiment 15 | T | 863 | 443 | 86 | 95 |
| Embodiment 16 | U | 848 | 415 | 91 | 98 |
| Embodiment 17 | V | 840 | 409 | 91 | 98 |
| Embodiment 18 | W | 803 | 391 | 91 | 98 |

In Batteries (R) to (T) of Embodiments 13 to 15, when the apparent density of the negative electrode is less than 2.5 g/cm³, the capacity retention remarkably decreases. Accordingly, it is preferable that the apparent density of the negative electrode be not less than 2.5 g/cm³.

In addition, in Batteries (U) to (W) of Embodiments 16 to 18, when the apparent density of the negative electrode exceeds 8.3 g/cm³, the energy density remarkably decreases. Accordingly, it is preferable that the apparent density of the negative electrode be not greater than 8.3 g/cm³.

Based on the findings above described, it was revealed that the preferable apparent density of the negative electrode lay in the range of 2.5 g/cm³ to 8.3 g/cm³.

Embodiment 19

In this example, required amounts of Sn powder and Ni powder were respectively weighed out and preparatively mixed in a mortar. This mixed powder was press molded into pellet form, and then placed on a water cooled copper hearth in an arc melting furnace. After the furnace atmosphere was substituted with Ar atmosphere, the pellet was melted by the irradiation of arc discharge, which was stopped after the molten metal was observed to have been mixed sufficiently. The molten metal was cooled by the water cooled copper hearth and formed a button-like solid. The cooling rate of the molten metal on the water cooled copper hearth was $3 \times 10^{2°}$ C./sec.

Figure 5:
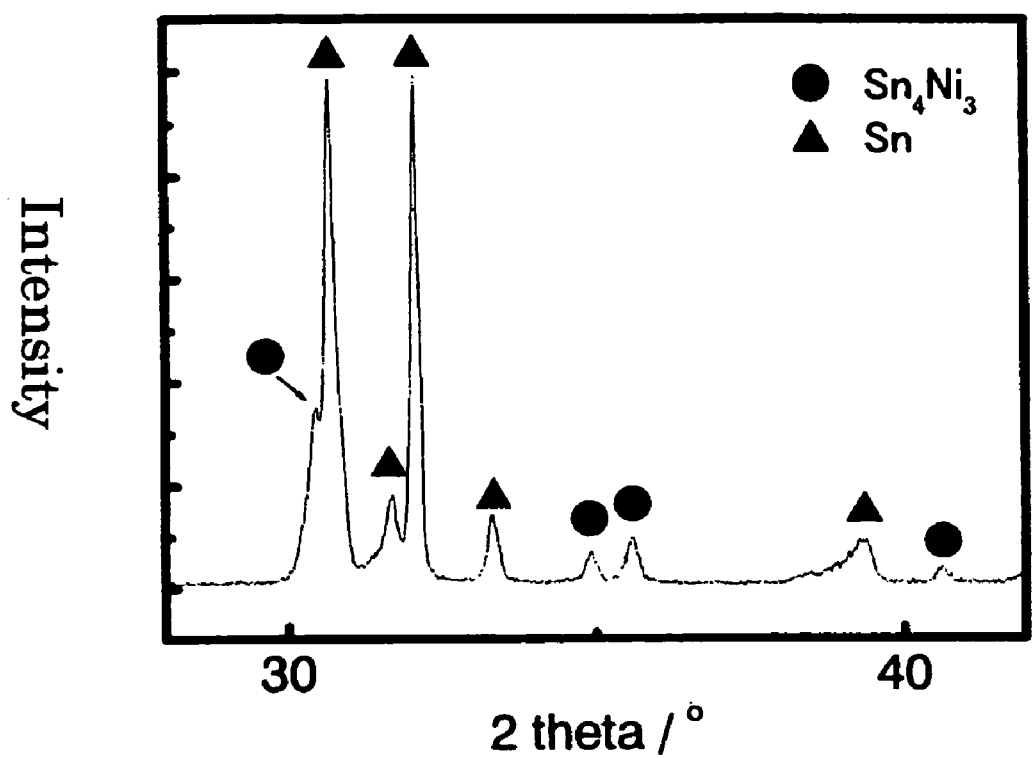
FIG. 5 is a view showing the X-ray diffraction pattern of alloy X used in Embodiment 19.

The obtained button-like solid was polished until the surface had a metallic luster, the polished one was then ground, and thus alloy X was obtained. From the X-ray diffraction pattern (X-ray source: $CuK\alpha_1$, and measurement range: $28° \leq 2\theta \leq 42°$) shown in FIG. 5, it was noted that this material contained only Sn phase and $Sn_4Ni_3$ phase.

The quantitative analysis of element was conducted for this alloy X using ICP emission spectrometry. Supposing that the masses of the starting materials, Sn and Ni elements, are respectively p mass % and q mass %, and those of Sn phase and $Sn_4Ni_3$ phase in alloy X are respectively v mass % and w mass %. This alloy X consists of only Sn phase and $Sn_4Ni_3$ phase; hence the following relational expressions are formulated between them.

$$p = [\text{mass of Sn phase}] + [\text{mass of Sn in Sn}_4\text{Ni}_3 \text{ phase}]$$
$$= v + w \times [\text{formula mass of Sn}] / [\text{formula mass of Sn}_4\text{Ni}_3]$$
$$= v + w \times 474.8/650.9$$
$$q = w \times [\text{mass of Ni in Sn}_4\text{Ni}_3 \text{ phase}]$$
$$= w \times [\text{formula mass of Ni}] / [\text{formula mass of Sn}_4\text{Ni}_3]$$
$$= w \times 176.1/650.9$$

Using the p and q values obtained by the quantitative analysis of element, the above described relational expressions were solved simultaneously to determine the values of v and w. Furthermore, using these values, Z(=v/w) was accordingly found to be 0.2.

A mixture was prepared so as to consist of 20 mass % of the above described alloy X and 80 mass % of graphite, mixed sufficiently in a mortar, and then used as the negative active material. In this negative active material, it was found that S=0.25. A paste was mixed and prepared so as to consist of 50 mass % of this negative active material, 5 mass % of PVdF and 45 mass % of NMP, and applied to both surfaces of Cu foil of 27 mm in width and 10 μm in thickness; the coated foil was dried at 150° C. to evaporate NMP and then pressed to adjust the porosity; and thus the negative electrode having the negative composite layer on the copper foil was provided.

In this negative electrode, the mass of the negative composite layer per unit area of one side surface of the current collector was set to be 7.23 mg/cm² so that the designed capacity of a completed battery can be 695±5 mAh. Here, the designed capacity refers to the discharge capacity which can be obtained in the following steps: in an incubator kept at 25° C., a battery was charged at a constant current of 35 mA until the voltage reached 4.1 V and subsequently charged for 2 hours at a constant voltage of 4.1 V, and then discharged at a current of 140 mA until the voltage dropped to 2.7 V. (Hereinafter; referred to simply as designed capacity.)

A paste was mixed and prepared so as to consist of 78 mass % of lithium cobalt oxide, 3 mass % of acetylene black, 4 mass % of PVdF and 15 mass % of NMP, and applied to both surfaces of aluminum foil of 26 mm in width and 15 μm in thickness; the coated foil was dried at 150° C. to evaporate NMP and then pressed; and thus the positive electrode having the positive composite layer on the aluminum foil was provided.

In this positive electrode, the mass of the positive composite layer per unit area of one side surface of the current collector was set to be 21.79 mg/cm² so that the designed capacity of a completed battery can be 695±5 mAh.

These positive and negative electrodes and a polyethylene separator of 29 mm in width and 20 μm in thickness were wound and then inserted into a prismatic, aluminum battery case of 47.0 mm in height, 29.2 mm in width and 4.15 mm in thickness. The total area of the portions of the positive composite layer and negative composite layer which were placed face to face were adjusted to be 2.40×10² cm², Furthermore, positive and negative leads were welded on to the positive and negative terminals located on the cover of the battery case, respectively, by means of ultrasonic welding, and then the cover was joined to the battery case by laser welding.

A mixed solution containing 1 mol/l of $LiPF_6$ dissolved in a mixture of EC and DEC in a volume ratio of 1:1, and used as an electrolyte. This electrolyte solution was poured through a filling opening of 1 mm in diameter provided on the battery case, and the opening was then sealed by laser welding. When calculated based on the outer size, the volume of the battery was determined to be 5.72 cm³. Battery assembly was implemented inside a dry room at 25° C. According to the above described procedures, two pieces of Battery (Y1) of Embodiment 19 were manufactured.

Embodiments 20 to 25, Comparative Example 6 and Embodiment 7c

By changing the weighing amounts of the starting materials, Sn powder and Ni powder, Z values of alloy X were set to lie in the range of 0.3 to 3, and the masses of the positive and negative composite layers per unit area of one side surface of the current collector were varied; except for the above, two pieces each of Batteries (Y2) to (Y7) of Embodiments 20 to 25 were manufactured in an identical manner to that of Embodiment 19.

In addition, Z value of alloy X was set to be 0.1, and the masses of the positive and negative composite layers per unit area of one side surface of the current collector were changed; except for the above, two pieces of Battery (Y8) of Comparative Example 6 were manufactured in an identical manner to that of Embodiment 19; and, Z value of alloy X was set to be 4.5, and the masses of the positive and negative composite layers per unit area of one side surface of the current collector were changed; except for the above, two pieces of Battery (Y9) of Embodiment 7c were manufactured in an identical manner to that of Embodiment 19.

The details of the batteries manufactured above, Embodiments 19 to 25, Comparative Example 6 and Embodiment 7c, were summarized in Table 7. Here, the values of the contents are expressed by the figures which were rounded to the nearest integer, the alloy contains only Sn and Ni, and confirmation that only Sn phase and $Sn_4Ni_3$ phase are contained has been made.

TABLE 7

| | Battery code | Element content in alloy mass % | | Porosity % | Z value of alloy X | Mass per one side surface of composite layer mg/cm² | |
|---|---|---|---|---|---|---|---|
| | | Sn | Ni | | | Negative electrode | Positive electrode |
| Comparative Example 6 | Y8 | 98 | 2 | 33 | 0.1 | 6.98 | 22.01 |
| Embodiment 19 | Y1 | 95 | 5 | 33 | 0.2 | 7.23 | 21.79 |
| Embodiment 20 | Y2 | 94 | 6 | 33 | 0.3 | 7.43 | 21.69 |
| Embodiment 21 | Y3 | 91 | 9 | 33 | 0.5 | 7.79 | 21.55 |
| Embodiment 22 | Y4 | 85 | 15 | 33 | 1.2 | 9.72 | 21.63 |
| Embodiment 23 | Y5 | 84 | 16 | 33 | 1.5 | 10.39 | 21.56 |
| Embodiment 24 | Y6 | 82 | 18 | 33 | 2.0 | 10.56 | 21.41 |

TABLE 7-continued

| Battery code | Element content in alloy mass % | | Porosity % | Z value of alloy X | Mass per one side surface of composite layer mg/cm² | |
|---|---|---|---|---|---|---|
| | Sn | Ni | | | Negative electrode | Positive electrode |
| Embodiment 25 | Y7 | 80 | 20 | 33 | 3.0 | 10.69 | 21.32 |
| Embodiment 7c | Y9 | 78 | 22 | 33 | 4.5 | 10.84 | 21.24 |

Battery Evaluation Test

Using one piece each of Batteries (Y1) to (Y9), the thicknesses, $t_1$ (mm), of the batteries before charge were measured, and then they were left for 3 hours in an incubator kept at 0° C. These batteries were charged at a constant current of 1400 mA equivalent to 2 C rate until the voltage reached 4.1 V and subsequently charged for 2 hours at a constant voltage of 4.1 V. Thirty minutes after completion of this charge, the thicknesses, $t_2$ (mm), of the batteries after charge were measured. Based on the results of the above measurements, battery swelling in the fast charge process at a low temperature was determined using the following equation. The results were shown in Table 8.

[Battery swelling] (mm)=$t_2$ (mm)−$t_1$ (mm)

It is not appropriate to use the battery which swells more than 0.25 mm for the purpose of power supply for portable electronics such as cellular phones because of a risk of battery pack failure. Accordingly, battery swelling has to be not greater than 0.25 mm. Repeated charge/discharge cycles are expected to cause a battery to slightly swell; therefore, it is desirable that battery swelling be not greater than 0.20 mm.

Using the other piece each of Batteries (Y1) to (Y9) that were not used for the above described test, a charge/discharge test was conducted in an incubator kept at 25° C. Each battery was charged at a constant current of 35 mA until the voltage reached 4.1 V and subsequently charged for 2 hours at a constant voltage of 4.1 V; and then discharged at a current of 140 mA until the voltage dropped to 2.7 V: taking these steps as one cycle, charge/discharge was repeated 50 cycles. Using the discharge capacity at the 1st cycle and that at the 50th cycle, capacity density and the capacity retention at the 50th cycle were calculated according to the following equations;

[Capacity density, mAh/cm³]=[discharge capacity at the 1st cycle, mAh]/[battery volume, cm³]

[Capacity retention at the 50th cycle, %]=[discharge capacity of the 50th cycle, mAh]/[discharge capacity at the 1st cycle, mAh]

The test results were summarized in Table 8.

TABLE 8

| | Battery code | Battery swelling mm | Discharge capacity at the 1st cycle mAh | Capacity density mAh/cm³ | Capacity retention at the 50th cycle % |
|---|---|---|---|---|---|
| Comparative Example 6 | Y8 | 0.21 | 693 | 121 | 91.5 |
| Embodiment 19 | Y1 | 0.15 | 695 | 122 | 93.5 |
| Embodiment 20 | Y2 | 0.13 | 694 | 121 | 94.1 |
| Embodiment 21 | Y3 | 0.10 | 695 | 122 | 95.5 |
| Embodiment 22 | Y4 | 0.11 | 696 | 122 | 95.4 |
| Embodiment 23 | Y5 | 0.12 | 695 | 122 | 94.8 |
| Embodiment 24 | Y6 | 0.14 | 696 | 122 | 93.8 |
| Embodiment 25 | Y7 | 0.17 | 694 | 121 | 92.8 |
| Embodiment 7c | Y9 | 0.23 | 698 | 122 | 91.5 |

Figure 6:
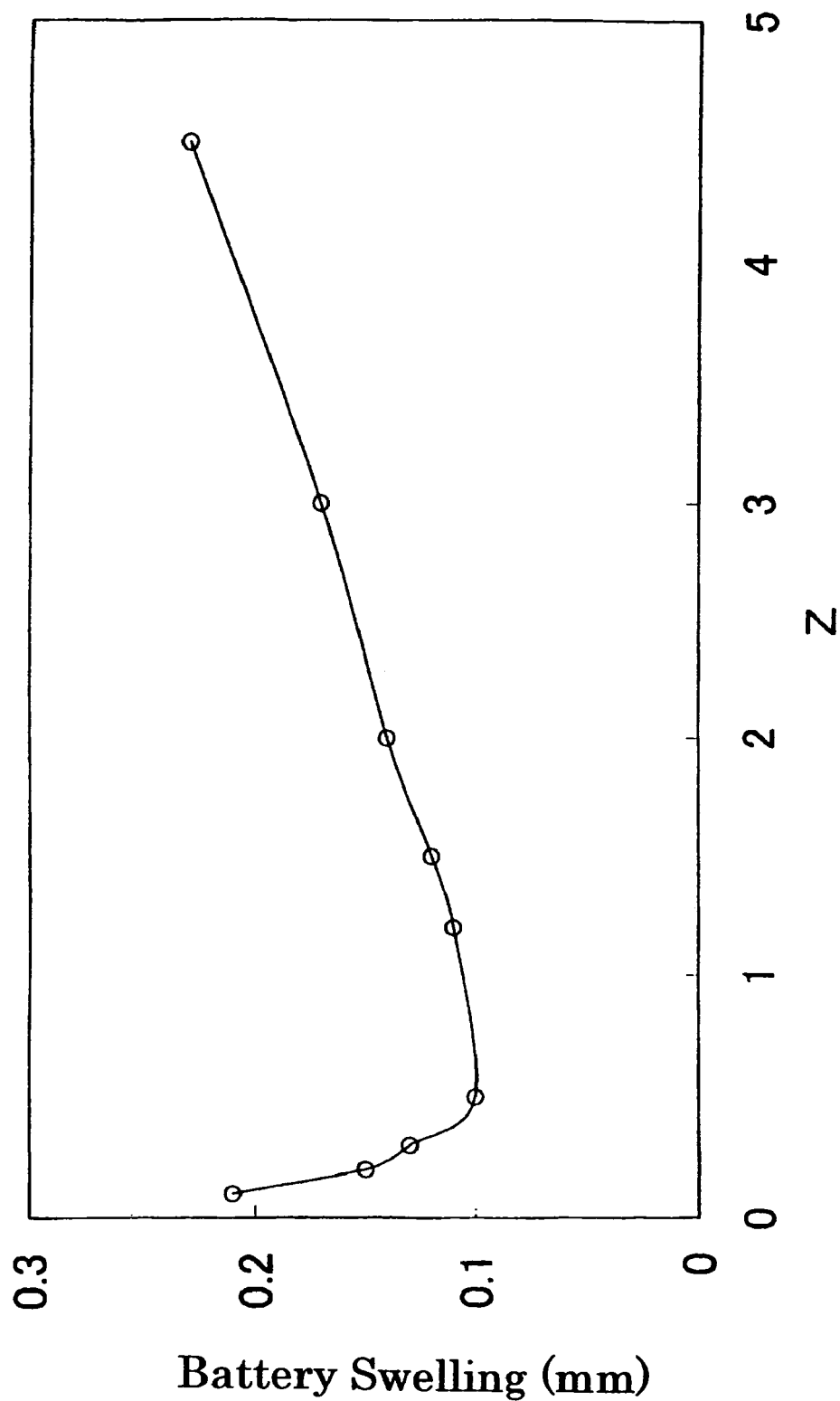
FIG. 6 is a view showing the relationship between battery swelling and Z.

In addition, FIG. 6 shows the relationship between the Z value, which is the ratio of the mass of $Sn_4Ni_3$ phase ($m_1$) to the mass of Sn phase ($m_2$) in alloy X used in the negative electrode of these batteries, and the battery swelling. Table 8 and FIG. 6 revealed the following.

Battery swelling in the fast charge process at a low temperature in each case of Batteries (Y1) to (Y7) of Embodiments 19 to 25 was not greater than 0.20 mm and less than those of Battery (Y8) of Comparative Example 6 and Battery (Y9) of Embodiment 7c.

In addition, capacity retention at the 50th cycle in each case of Batteries (Y1) to (Y7) of Embodiments 19 to 25 was not less than 92.5% and greater than those of Battery (Y8) of Comparative Example 6 and Battery (Y9) of Embodiment 7c.

Moreover, discharge capacity at the 1st cycle and capacity density were almost same in Batteries (Y1) to (Y9) of Embodiments 19 to 25, Comparative Example 6 and Embodiment 7c.

Embodiments 26 and 261, Comparative Examples 8 to 10

Z value of alloy X was set to be 1.1; except for the above, two pieces of Battery (Y10) of Embodiment 26 were manufactured in an identical manner to that of Embodiment 19. In this negative electrode, the mass of the negative composite layer per unit area of one side surface of the current collector was set to be 8.35 mg/cm² and, in the positive electrode, the mass of the positive composite layer per unit area of one side surface of the current collector was set to be 21.62 mg/cm² so that the designed capacity of the completed battery can be 695±5 mAh.

In the battery of Comparative Example 8, only graphite was used as the negative active material. A paste was mixed and prepared so as to consist of 50 mass % of graphite, 5 mass % of PVdF and 45 mass % of NMP; and applied to both surfaces of Cu foil of 27 mm in width and 10 μm in thickness; the coated foil was dried at 150° C. to evaporate NMP and then pressed to adjust the porosity; and thus the negative electrode was provided. Except for using this negative electrode, two pieces of Battery (Y11) of Comparative Example 8 were manufactured in an identical manner to that of Embodiment 19.

In the battery of Comparative Example 9, a mixture of a material consisting of $Sn_4Ni_3$ phase alone and graphite was used as the negative active material. 20 mass % of a material consisting of only $Sn_4Ni_3$ phase and 80 mass % of graphite were mixed sufficiently in a mortar to prepare the negative active material. A paste was mixed and prepared so as to consist of 50 mass % of this negative active material, 5 mass % of PVdF and 45 mass % of NMP, and applied to both surfaces of Cu foil of 27 mm in width and 10 μm in thickness; the coated foil was dried at 150° C. to evaporate NMP and then pressed to adjust the porosity; and thus the negative electrode was provided. Except for using this negative electrode, two pieces each of Battery (Y12) of Comparative Example 9 were manufactured in an identical manner to that of Embodiment 19.

In the battery of Comparative Example 10, a mixture of a material consisting of Sn phase alone and graphite was used as the negative active material. Except for using this negative active material, two pieces of Battery (Y13) of Comparative Example 10 were manufactured in an identical manner to that of Comparative Example 9.

In the battery of Embodiment 261, the same alloy as the one used in Embodiment 26 was used and no graphite was mixed; except for the above, the battery was manufactured in an identical manner to that of Embodiment 26.

The details of the batteries manufactured above, Embodiments 26 and 261 and Comparative Examples 8 to 10 were summarized in Table 9 and Table 10. Here, the values of the contents are expressed by the figures which were rounded to the nearest integer, the alloy contains only Sn or Ni, and confirmation that only Sn phase or $Sn_4Ni_3$ phase are contained has been made.

TABLE 10

| | Battery code | Mass per one side surface of composite layer mg/cm² | |
|---|---|---|---|
| | | Negative electrode | Positive electrode |
| Embodiment 26 | Y10 | 8.35 | 21.62 |
| Comparative Example 8 | Y11 | 10.09 | 21.27 |
| Comparative Example 9 | Y12 | 10.75 | 20.99 |
| Comparative Example 10 | Y13 | 7.31 | 22.55 |
| Embodiment 261 | Y101 | 11.85 | 23.63 |

Concerning Batteries (Y10) to (Y13) of Embodiments 26 and 261 and Comparative Examples of 8 to 10, battery swelling, the discharge capacity at the 1st cycle, capacity density and the capacity retention at the 50th cycle were determined under the same conditions as Battery (Y1) of Embodiment 19. The results were summarized in Table 11.

TABLE 11

| | Battery code | Battery swelling mm | Discharge capacity at the 1st cycle mAh | Capacity density mAh/cm³ | Capacity retention at the 50th cycle % |
|---|---|---|---|---|---|
| Embodiment 26 | Y10 | 0.10 | 695 | 122 | 95.2 |
| Comparative Example 8 | Y11 | 0.38 | 695 | 122 | 89.9 |
| Comparative Example 9 | Y12 | 0.33 | 692 | 121 | 93.8 |
| Comparative Example 10 | Y13 | 1.12 | 694 | 121 | 71.1 |
| Embodiment 261 | Y101 | 0.61 | 693 | 121 | 92.8 |

Based on the results in Table 11, the following were revealed. Compared to Battery (Y10) of Embodiment 26, where alloy X and graphite were contained in the negative active material, Battery (Y11) of Comparative Example 8, where only graphite was used as the negative active material, exhibited an increase in battery swelling and a decrease in capacity retention. In addition, in Battery (Y12) of Compara-

TABLE 9

| | Battery code | Element content in alloy mass % | | Porosity % | Composition of negative active material mass % | | | Alloy X | |
|---|---|---|---|---|---|---|---|---|---|
| | | Sn | Ni | | Graphite | $Sn_4Ni_3$ phase | Sn phase | Z value | S value |
| Embodiment 26 | Y10 | 86 | 14 | 33 | 80 | 10.5 | 9.5 | 1.1 | 0.25 |
| Comparative Example 8 | Y11 | | | 33 | 100 | 0 | 0 | — | 0.25 |
| Comparative Example 9 | Y12 | 73 | 27 | 33 | 80 | 20 | 0 | — | 0.25 |
| Comparative Example 10 | Y13 | 100 | | 33 | 80 | 0 | 20 | 0 | 0 |
| Embodiment 261 | Y101 | 86 | 14 | 33 | 0 | 52.5 | 47.5 | 1.1 | — | tive Example 9, where $Sn_4Ni_3$ phase and graphite were contained in the negative active material, battery swelling was large. Moreover, in Battery (Y13) of Comparative Example 10, where Sn phase and graphite were contained in the negative active material, battery swelling was significantly large and the capacity retention at the 50th cycle was significantly low. Furthermore, in Comparative Examples 8 and 9, it was noted that metallic lithium deposition occurred and caused the swelling of the batteries. In addition, in Comparative Examples 8 and 9 compared to other batteries, more active materials were put in so that the discharge capacities of these batteries were conformed to those of other batteries; hence, this contributes to an increase in swelling, too. The reason for putting in many active materials is that $Sn_4Ni_3$ phase has little capability of charge/discharge and that the charge/discharge capacity of graphite is remarkably low compared to that of Sn phase.

From the above described findings, in order to reduce battery swelling in the fast charge process at a low temperature and to enhance cycle life performance, it was found to be preferable that the negative electrode contain the alloy which contains $Sn_4Ni_3$ phase and Sn phase and carbon material.

When the negative active material contains the alloy X which contains $Sn_4Ni_3$ phase and Sn phase and carbon material, volumetric capacity is large compared to that of carbon material, because the negative active material contains Sn phase superior in $Li^+$ storage ability compared to the case where only carbon material is contained. Alloy X contains $Sn_4Ni_3$ phase inferior in insertion/extraction of Li, and this serves as a framework structure of preventing the volume expansion/contraction or crack from occurring at the time of $Li^+$ insertion/extraction in the alloy material; therefore, it is believed that the battery of the present invention exhibited the equal or higher capacity density and cycle life performance than those of conventional type, at room temperature.

Embodiments 27 to 31 and
Embodiments 11c and 12c

In these examples, Z values of alloy X to be used as the negative active material were set to be 1.1, and the mixture ratios of alloy X and carbon material, S values ($=n_1/n_2$), were varied; except for the above, two pieces each of Batteries (Y14) to (Y20) of Embodiments 27 to 31 and Embodiments 11c and 12c were manufactured in an identical manner to that of Embodiment 19. The details of the batteries manufactured above were summarized in Table 12. In addition, the battery of Embodiment 26 was also listed in Table 12.

TABLE 12

| Battery code | S value of negative active material | Mass per one side surface of composite layer mg/cm² | |
|---|---|---|---|
| | | Negative electrode | Positive electrode |
| Embodiment 11c | Y19 | 0.03 | 8.48 | 21.64 |
| Embodiment 27 | Y14 | 0.05 | 8.47 | 21.32 |
| Embodiment 28 | Y15 | 0.07 | 8.42 | 21.43 |
| Embodiment 26 | Y10 | 0.25 | 8.35 | 21.62 |
| Embodiment 29 | Y16 | 0.50 | 8.17 | 21.86 |
| Embodiment 30 | Y17 | 1.00 | 7.74 | 21.96 |
| Embodiment 31 | Y18 | 3.5 | 7.21 | 22.06 |
| Embodiment 12c | Y20 | 4.0 | 6.92 | 22.36 |

Concerning Batteries (Y14) to (Y20) of Embodiments 27 to 31 and Embodiments 11c and 12c, battery swelling, the discharge capacity at the 1st cycle, capacity density and the capacity retention at the 50th cycle were determined under the same conditions as Battery (Y1) of Embodiment 19. The results were summarized in Table 13.

TABLE 13

| | Battery code | Battery swelling mm | Discharge capacity at the 1st cycle mAh | Capacity density mAh/cm³ | Capacity retention at the 50th cycle % |
|---|---|---|---|---|---|
| Embodiment 11c | Y19 | 0.27 | 696 | 122 | 90.3 |
| Embodiment 27 | Y14 | 0.14 | 693 | 122 | 94.3 |
| Embodiment 28 | Y15 | 0.12 | 697 | 121 | 94.8 |
| Embodiment 26 | Y10 | 0.10 | 695 | 122 | 95.2 |
| Embodiment 29 | Y16 | 0.11 | 695 | 122 | 95.2 |
| Embodiment 30 | Y17 | 0.12 | 693 | 121 | 94.3 |
| Embodiment 31 | Y18 | 0.14 | 693 | 121 | 92.5 |
| Embodiment 12c | Y20 | 0.30 | 694 | 121 | 89.5 |

Figure 7:
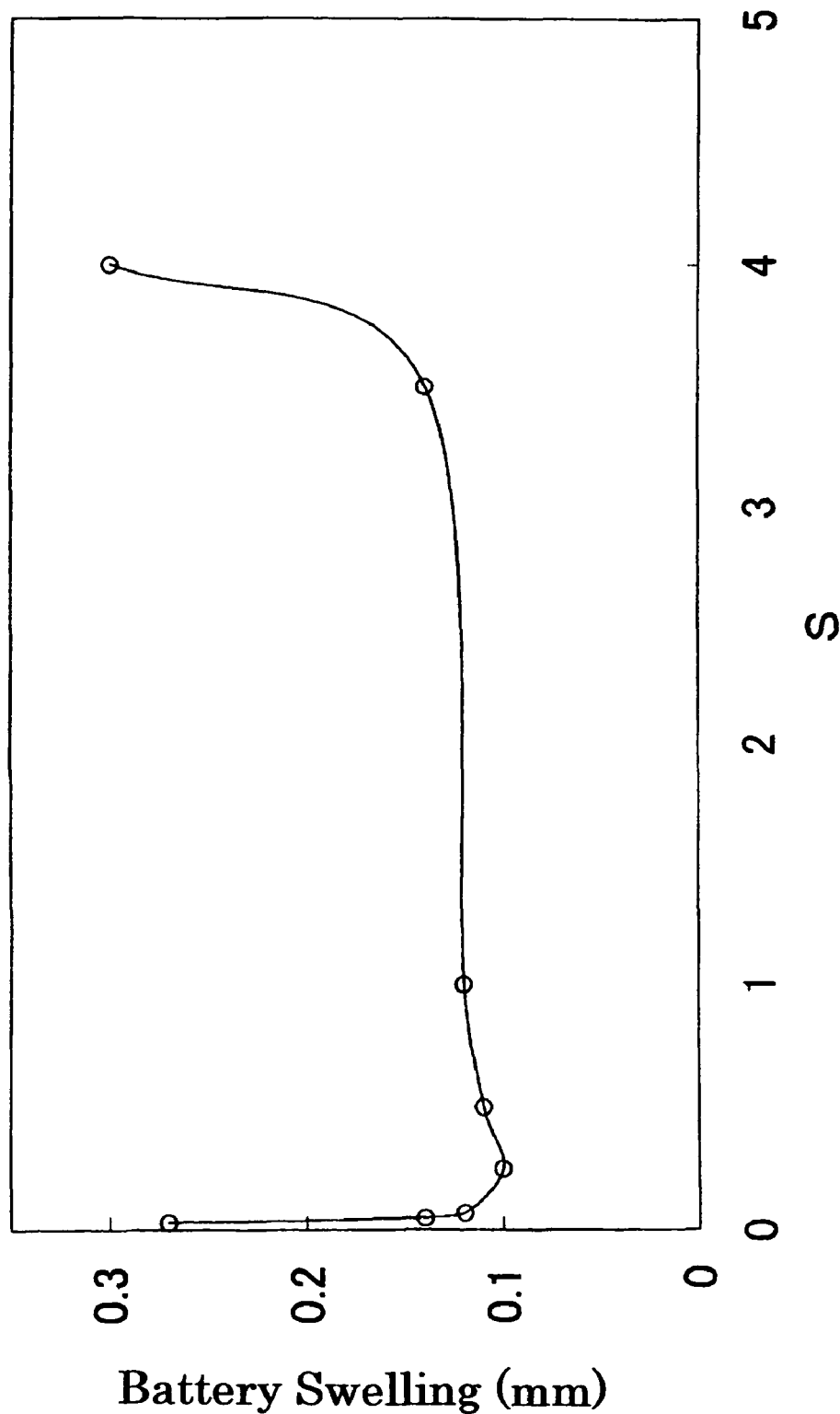
FIG. 7 is a view showing the relationship between battery swelling and S.

In addition, FIG. 7 shows the relationship between the S value, which is the ratio of the mass of alloy X ($n_1$) to the mass of carbon material ($n_2$) in the negative electrode, and battery swelling in these batteries.

Table 13 and FIG. 7 revealed the following. In Batteries (Y10) and (Y14) to (Y18) of Embodiments 26 to 31, where S value of the negative active material falls within the range of 0.05 to 3.5, battery swelling was small, not greater than 0.14 mm, and capacity retention at the 50th cycle was high. While, in Battery (Y19) of Embodiment 11c, where S value is 0.03, and Battery (Y20) of Embodiment 12c, where S value is 4.0, battery swelling was not less than 0.25 mm, and capacity retention at the 50th cycle was low.

The reason for this is inferred as follows: in case of S<0.05, the ratio of the mass of alloy X to that of carbon material was significantly low, so that the effect of reducing metallic lithium production in the fast charge process at a low temperature was insufficient and this resulted in battery swelling.

It is also inferred that in case of S>3.5, the ratio of the mass of alloy X to that of carbon material was high, so that the effect of expansion of alloy X became large, current collection performance in the negative electrode plate deteriorated and current distribution became nonuniform; as a result, Li storage reaction in carbon material as well as metallic lithium production reaction occurred and this resulted in battery swelling.

Embodiment 32

In this example, Sn powder, Ni powder and Ag powder were weighed out to 88 mass %, 9 mass % and 3 mass %, respectively, and preparatively mixed in a mortar. This mixed powder was press molded into pellet form, and then placed on a water cooled copper hearth in an arc melting furnace. After the furnace atmosphere was substituted with Ar atmosphere, the pellet was melted by the irradiation of arc discharge, which was stopped after the molten metal was observed to have been mixed sufficiently. The molten metal was cooled by the water cooled copper hearth and formed a button-like solid. The cooling rate of the molten metal on the water cooled copper hearth was $5 \times 10^{2\circ}$ C./sec. The obtained button-like solid was polished until the surface had a metallic luster, the polished one was then ground, and thus alloy Y was obtained.

Figure 8:
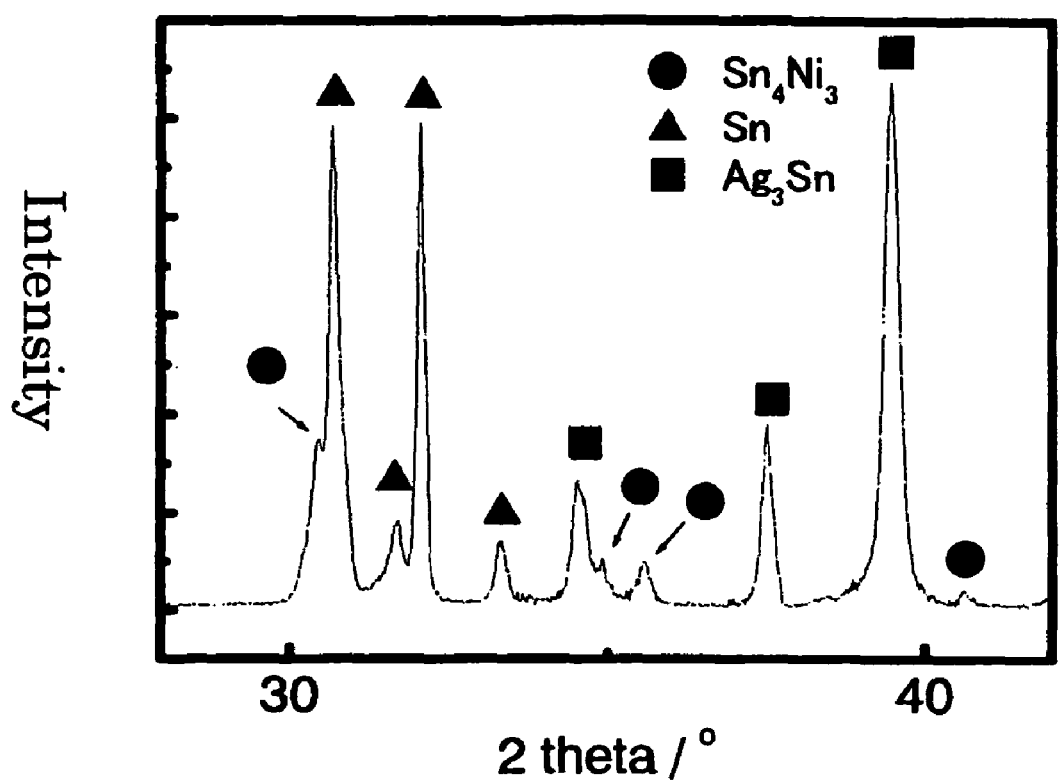
FIG. 8 is a view, showing the X-ray diffraction pattern of alloy Y used in Embodiment 32.

From the X-ray diffraction pattern (X-ray source: CuK$\alpha_1$, and measurement range: $28° \leq 2\theta \leq 42°$) shown in FIG. 8, it was noted that this alloy Y contained only Sn phase, $Sn_4Ni_3$ phase and $Ag_3Sn$ phase. The quantitative analysis of element was conducted for this alloy Y using ICP emission spectrometry. Supposing that the masses of Sn, Ni and Ag elements are defined to be p mass %, q mass % and r mass %, respectively, and that the masses of Sn phase, $Sn_4Ni_3$ phase and $Ag_3Sn$ phase in alloy Y are defined to be v mass %, w mass % and u mass %, respectively. This alloy Y consists of only Sn phase, $Sn_4Ni_3$ phase and $Ag_3Sn$ phase; hence the following relational expressions are formulated between them.

$$p = [\text{mass of Sn phase}] + [\text{mass of Sn in } Sn_4Ni_3 \text{ phase}] + [\text{mass of Sn in } Ag_3Sn \text{ phase}]$$

$$= v + w \times [\text{formula mass of Sn}]/[\text{formula mass of } Sn_4Ni_3] + u \times [\text{formula mass of Sn}]/[\text{formula mass of } Ag_3Sn]$$

$$= v + w \times 474.8/650.9 + u \times 118.7/442.3$$

$$q = w \times [\text{mass of Ni in } Sn_4Ni_3 \text{ phase}]$$

$$= w \times [\text{formula mass of Ni}]/[\text{formula mass of } Sn_4Ni_3]$$

$$= w \times 176.1/650.9$$

$$r = w \times [\text{mass of Sn in } Ag_3Sn \text{ phase}]$$

$$= w \times [\text{formula mass of Ag}]/[\text{formula mass of } Ag_3Sn]$$

$$= w \times 323.6/442.3$$

Using the p, q and r values obtained by the quantitative analysis of element the above described relational expressions were solved simultaneously to determine the values of v, w and u. Furthermore, using these values, Z (=v/w) value was accordingly found to be 1.9. Except for using this powder, Battery (Y21) of Embodiment 32 was manufactured in an identical manner to that of Embodiment 19 (S=0.25). Battery swelling, the discharge capacity at the 1st cycle, capacity density and the capacity retention at the 50th cycle were determined under the same conditions as Embodiment 19. The results were obtained as follows:

Mass per one side surface of negative composite layer=8.45 mg/cm$^2$

Mass per one side surface of composite layer=21.58 mg/cm$^2$

Battery swelling=0.15 mm

Discharge capacity at the 1st cycle=695 mAh

Capacity density=122 mAh/cm$^3$

Capacity retention at the 50th cycle=95.7%.

In alloy Y used in the negative electrode of Battery (Y21) of Embodiment 32, $Ag_3Sn$ phase is present in addition to Sn phase and $Sn_4Ni_3$ phase. This indicates that it is possible to contain a phase other than Sn phase and $Sn_4Ni_3$ phase in alloy X to be used in the negative electrode of the non-aqueous electrolyte battery of the present invention. It is preferable that a phase other than Sn phase and $Sn_4Ni_3$ phase be not greater than 50 mass % with respect to total mass of alloy Y. This is due to the reason that the effects based on the above described mechanisms, such as the increase in discharge capacity and the prevention of volume expansion/contraction or crack occurrence, become less.

Measurement of Alloy Grinding Time

Alloy X used in Batteries (Y1) to (Y10) was ground by ball milling method, and the time required for the particle size at 90% of mass integration, $D_{90}$, to reach 45 μm and smaller was measured and termed as preparation time. The results are shown in Table 14.

TABLE 14

|  | Battery | Alloy X | |
| --- | --- | --- | --- |
|  | code | Z value | Preparation time hr. |
| Comparative Example 6 | Y8 | 0.1 | 90 |
| Embodiment 19 | Y1 | 0.2 | 28 |
| Embodiment 20 | Y2 | 0.3 | 18 |
| Embodiment 21 | Y3 | 0.5 | 16 |
| Embodiment 26 | Y10 | 1.1 | 12 |
| Embodiment 22 | Y4 | 1.2 | 12 |
| Embodiment 23 | Y5 | 1.5 | 14 |
| Embodiment 24 | Y6 | 2.0 | 16 |
| Embodiment 25 | Y7 | 3.0 | 18 |
| Embodiment 7c | Y9 | 4.5 | 20 |

From Table 14, the time required to grind material X used in Batteries (Y1) to (Y7), (Y9) and (Y10) of Embodiments 19 to 26 and Embodiment 7c was found to be significantly short compared to that for grinding material X used in Battery (Y8) of Comparative Example 6.

Based on the above findings, it was revealed that when the mass ratio of $Sn_4Ni_3$ phase to Sn phase in material X was not less than 0.2, the time for preparing negative electrode was able to be reduced

INDUSTRIAL APPLICABILITY

The present invention enables practical application of a non-aqueous electrolyte secondary battery which has high energy density and satisfactory cycle performance.

What is claimed is:

1. A non-aqueous electrolyte secondary battery comprising:
   a negative electrode with a composite layer containing a negative active material;
   a positive electrode; and
   a non-aqueous electrolyte;
   characterized in that
   said negative active material is an alloy containing 5 to 25 mass % of nickel and 75 to 95 mass % of tin, said alloy contains $Sn_4Ni_3$ phase and Sn phase, and the content ratio of said $Sn_4Ni_3$ phase and said Sn phase in said alloy is $0.2 \leq Z \leq 3$ when $m_1$ is the mass of said $Sn_4Ni_3$ phase, $m_2$ is the mass of said Sn phase, and $Z = m_1 / m_2$.

2. The non-aqueous electrolyte secondary battery according to claim 1, characterized in that said composite layer contains carbon material.

3. The non-aqueous electrolyte secondary battery according to claim 1, characterized in that said composite layer contains carbon material, and when $n_1$ is the mass of said alloy, $n_2$ is the mass of said carbon material, and $S = n_1 / n_2$, S falls within the range of $0.05 \leq S \leq 3.5$.

4. The non-aqueous electrolyte secondary battery according to claim 1, characterized in that in said composite layer, powdered negative active material is used, and the porosity of said composite layer is 30 to 75%.

5. The non-aqueous electrolyte secondary battery according to claim 2, characterized in that in said composite layer, powdered negative active material is used, and the porosity of said composite layer is 30 to 75%.

6. The non-aqueous electrolyte secondary battery according to claim 3, characterized in that in said composite layer, powdered negative active material is used, and the porosity of said composite layer is 30 to 75%.

7. The non-aqueous electrolyte secondary battery according to claim 1, characterized in that the apparent density of said negative electrode is 2.5 to 8.3 $g/cm^3$.

8. The non-aqueous electrolyte secondary battery according to claim 2, characterized in that the apparent density of said negative electrode is 2.5 to 8.3 $g/cm^3$.

9. The non-aqueous electrolyte secondary battery according to claim 3, characterized in that the apparent density of said negative electrode is 2.5 to 8.3 $g/cm^3$.

10. A non-aqueous electrolyte secondary battery comprising:

a negative electrode with a composite layer containing a negative active material;

a positive electrode; and a non-aqueous electrolyte;

characterized in that said negative active material is an alloy containing 5 to 25 mass % of nickel and 75 to 95 mass % of tin, said alloy contains $Sn_4Ni_3$ phase and Sn phase, said alloy comprises Sn having a peak lying in a range of $30.5° \leq 2\theta \leq 30.8°$ in X-ray diffraction obtained with $CuK\alpha_1$ radiationm, and the content ratio of said $Sn_4Ni_3$ phase and said Sn phase in said alloy is $0.2 \leq Z \leq 3$ when $m_1$ is the mass of said $Sn_4Ni_3$ phase, $m_2$ is the mass of said Sn phase, and $Z = m_1 / m_2$.

* * * * *